United States Patent
Cheng et al.

(10) Patent No.: US 11,046,553 B2
(45) Date of Patent: Jun. 29, 2021

(54) ELEVATOR AUTOMATIC RESCUE AND ENERGY-SAVING DEVICE AND CONTROL METHOD FOR SAME AND SUPER CAPACITOR MODULE

(71) Applicant: Forward Electronics Company Limited, Hong Kong (CN)

(72) Inventors: Eric Ka Wai Cheng, Hong Kong (CN); Eugene Yu Ching Chan, Hong Kong (CN); Xiangdang Xue, Hong Kong (CN); Lok Yan Lorraine Chan, Hong Kong (CN)

(73) Assignee: Forward Electronics Company Limited, Hong Kong (CN)

( * ) Notice: Subject to any disclaimer, the term of this patent is extended or adjusted under 35 U.S.C. 154(b) by 672 days.

(21) Appl. No.: 15/750,897

(22) PCT Filed: Sep. 10, 2015

(86) PCT No.: PCT/CN2015/089365
§ 371 (c)(1),
(2) Date: Feb. 7, 2018

(87) PCT Pub. No.: WO2017/024653
PCT Pub. Date: Feb. 16, 2017

(65) Prior Publication Data
US 2018/0229968 A1  Aug. 16, 2018

(30) Foreign Application Priority Data

Aug. 7, 2015  (CN) .......................... 201510484927.1
Aug. 7, 2015  (CN) .......................... 201520595650.5

(51) Int. Cl.
*B66B 5/02*  (2006.01)
*B66B 1/30*  (2006.01)
(Continued)

(52) U.S. Cl.
CPC .............. *B66B 5/027* (2013.01); *B66B 1/302* (2013.01); *B66B 1/308* (2013.01); *B66B 1/32* (2013.01);
(Continued)

(58) Field of Classification Search
CPC ......... B66B 5/027; B66B 1/302; B66B 1/308; B66B 1/32; B66B 1/3446; B66B 5/0018;
(Continued)

(56) References Cited

U.S. PATENT DOCUMENTS 5,285,029 A     2/1994  Araki
2003/0089556 A1  5/2003  Eilinger
(Continued)

FOREIGN PATENT DOCUMENTS

CN    101807821 A    8/2010
CN    101917020 A    12/2010
(Continued)

OTHER PUBLICATIONS

Korean Office Action received in related application No. 10-2015-7035977, dated Aug. 29, 2018, six pages.
(Continued)

*Primary Examiner* — Jeffrey Donels
(74) *Attorney, Agent, or Firm* — Weisun Rao; Jun Chen; Venture Partner, LLC

(57) ABSTRACT

An elevator automatic rescue and energy-saving control method, the method comprising: when the power grid supplies power normally, selecting a single current in a three-phase power grid (9) as an AC power supply for an elevator control system (10); controlling a DC-DC converter (2) to charge the super capacitor module (1) connected to the DC-DC converter to a specified standby electric energy level; and when the power grid is suddenly interrupted, selecting to use the electric energy stored in the super
(Continued)

capacitor module (1) as a rescue electric energy for a traction motor (7) and the elevator control system (10). The described method uses a super capacitor module, so that a stable and reliable elevator rescue power supply is provided when the power grid is suddenly interrupted, and the regenerative electric energy dissipated during elevator braking operation is stored and utilized during elevator operation, thereby conserving energy.

18 Claims, 8 Drawing Sheets

(51) Int. Cl.
    *B66B 1/32* (2006.01)
    *B66B 1/34* (2006.01)
    *B66B 5/00* (2006.01)
    *H02J 7/00* (2006.01)
    *H02J 9/06* (2006.01)
    *H02M 3/158* (2006.01)
    *H02M 7/537* (2006.01)
    *H02P 27/06* (2006.01)
    *H02J 7/34* (2006.01)

(52) U.S. Cl.
    CPC .......... *B66B 1/3446* (2013.01); *B66B 5/0018* (2013.01); *H02J 7/0014* (2013.01); *H02J 9/062* (2013.01); *H02M 3/158* (2013.01); *H02M 7/537* (2013.01); *H02P 27/06* (2013.01); *B66B 2201/00* (2013.01); *H02J 7/345* (2013.01)

(58) Field of Classification Search
    CPC ..... B66B 2201/00; H02J 7/0014; H02J 9/062; H02J 7/345; H02M 3/158; H02M 7/537; H02P 27/06; Y02B 70/30; Y04S 20/20
    See application file for complete search history.

(56) References Cited

U.S. PATENT DOCUMENTS

| | | | |
|---|---|---|---|
| 2003/0214267 A1 | 11/2003 | Long | |
| 2007/0084673 A1 | 4/2007 | Smith et al. | |
| 2009/0014252 A1* | 1/2009 | Vedula | B66B 1/302 187/290 |
| 2010/0006378 A1* | 1/2010 | Blasko | B66B 1/30 187/290 |
| 2010/0044160 A1* | 2/2010 | Agirman | B66B 5/027 187/290 |
| 2011/0139550 A1* | 6/2011 | Veronesi | B66B 5/027 187/290 |
| 2011/0208360 A1 | 8/2011 | Oggianu et al. | |
| 2013/0201732 A1* | 8/2013 | Barauna | H02M 5/458 363/37 |
| 2014/0015321 A1 | 1/2014 | Nordin | |
| 2017/0057789 A1* | 3/2017 | Witczak | B66B 11/0273 |

FOREIGN PATENT DOCUMENTS

| | | |
|---|---|---|
| CN | 201850017 U | 6/2011 |
| CN | 102211724 A | 10/2011 |
| CN | 102723763 A | 10/2012 |
| CN | 102923537 A | 2/2013 |
| CN | 103193123 A | 7/2013 |
| CN | 103441521 A | 12/2013 |
| CN | 104350001 A | 2/2015 |
| CN | 204516591 U | 7/2015 |
| CN | 204928347 U | 12/2015 |
| EP | 2336068 A1 | 6/2011 |
| KR | 20080040336 A | 5/2008 |
| KR | 20140122570 A | 10/2014 |
| TW | 541280 B | 7/2003 |
| TW | I286121 B | 9/2007 |
| TW | I439008 B | 5/2014 |

OTHER PUBLICATIONS

Taiwanese Office Action received in related application No. 104132799, dated Dec. 8, 2016, nine pages.
European Office Action received in related application No. 15781010. 2, dated Nov. 10, 2017, eight pages.
Korean Office Action received in related application No. 10-2015-7035977, dated Jul. 18, 2017, seven pages.

* cited by examiner

ELEVATOR AUTOMATIC RESCUE AND ENERGY-SAVING DEVICE AND CONTROL METHOD FOR SAME AND SUPER CAPACITOR MODULE

CROSS-REFERENCE TO RELATED APPLICATIONS

This application is based on International Application No. PCT/CN2015/089365, filed on Sep. 10, 2015, which claims priority to Chinese Patent Application No. 201510484927.1 and Chinese Patent Application No. 201520595650.5, both filed on Aug. 7, 2015, the entire contents of which are incorporated herein by reference.

TECHNICAL FIELD OF THE INVENTION

The present application relates to fault test and energy saving of lifts, and more particularly to a device for automatically rescuing a lift and saving energy and a method thereof, and a super-capacitor module.

BACKGROUND OF THE INVENTION

Current lifts have two key weaknesses. The one is that they cannot be used in case of emergency (such as power failure). Consequently, the lift could stop suddenly in case of a power interrupt or a serious voltage dip because no power is supplied to the lift system. Thus, passengers in the lift will be under security or safety threat due to rare air, poor air conditioning, which will result in their nervous, anxious and panic emotion. Furthermore, it is difficult to get the passengers out of the lift. The other is that the energy generated during braking of the lift motor is dissipated by a braking resistor. Consequently, the lift system has the low operation efficiency.

For current technology of emergency stopping-at-right-floor-level devices or sometimes it is also called stopping-at-floor, the rechargeable battery is generally selected as the backup supply in the case of emergency. It should be pointed out that the rechargeable battery has the disadvantages, such as limited service lifetime, long charging time and small voltage range. Consequently, those have effect on stability and reliability of emergency stopping-at-right-floor-level devices.

For a lift, the down motion under heavy load or up motion under light load results in changes in term of potential energy, and when the lift decelerates, a traction motor thereof may generate braking energy. The braking energy may be fed back to a DC bus of an inverter through a motor and the inverter. Consequently, the voltage of the DC bus rises. However, it is well known that the voltage of the DC bus may not be over a limitation. To keep the voltage of the DC bus at the safe level, two approaches are used generally to release the feedback energy. The one is that the energy is dissipated based on the braking resistor and the other is that the feedback energy is output to the power grid via the inverter. Obviously, the former wastes the feedback energy and the latter recovers the feedback energy effectively. However, the latter has no ignorable disadvantage that the power output to the power grid possesses more harmonics which results in pollution to the power grid.

BRIEF SUMMARY OF THE INVENTION

The present application is to provide a device for automatically rescuing a lift and saving energy and a method thereof based on a super-capacitor module, which can stably and reliably provide the backup supply for emergency stopping-at-right-floor-level of lifts and implement the energy-saving operation of lifts when power failure happens suddenly.

According to an aspect of the present application, there is provided a device for automatically rescuing a lift and saving energy, comprising: a super-capacitor module configured to store energy comprising backup energy for emergency stopping-at-right-floor-level of the lift and feedback energy generated by a traction motor during braking; a DC-DC converter connected to the super-capacitor module and a motor drive for driving the traction motor of the lift, and configured to convert a voltage level of the super-capacitor module into a voltage level of a DC bus of the motor drive, and further configured to convert the voltage level of the DC bus into the voltage level of the super-capacitor module; a DC-AC inverter connected to the DC-DC converter, and configured to convert DC power output from the DC-DC converter into AC power; a switch circuit connected to the DC-AC inverter and a power grid, and configured to select and switch between the DC-AC inverter and the power grid so as to output the converted AC power by the DC-AC inverter to a lift controller or output power from the power grid to the lift controller; and an energy management system connected to the DC-DC converter, the DC-AC inverter, and the switch circuit and configured to, if power from the power grid is available, control the switch circuit that selects the power grid to be connected the lift controller as AC supply of the lift controller, and control the DC-DC converter that charges the super-capacitor module to a specified backup energy; and also configured to, if the power from the power grid is unavailable, control the DC-DC converter that converts the energy in the super-capacitor module into DC power to be output to the DC-AC inverter, control the DC-AC inverter that converts the DC power into AC power, and control the switch circuit that selects the AC power as the AC supply of the lift controller while controlling the DC-DC converter that supplies the energy in the super-capacitor module to the motor drive.

According to an embodiment of the present application, the super-capacitor module comprises a plurality of branches connected in parallel, wherein each branch comprises a plurality of super-capacitor units connected in series, each of which comprises a super-capacitor and a balancing circuit connected in parallel with each other, and wherein the balancing circuit is used for maintaining normal operation of the super-capacitor connected in parallel with the balancing circuit in an allowable operation range.

According to an embodiment of the present application, the energy management system is further configured to control the DC-DC converter that enables the super-capacitor module to store the feedback energy generated by the traction motor during braking when the traction motor operates in a braking mode, and control the DC-DC converter that supplies the stored feedback energy to the traction motor when the traction motor is in a motoring mode.

According to an embodiment of the present application, the energy management system is further configured to: when the traction motor operates in the braking mode, if the energy of the super-capacitor module is less than an upper limit of the feedback energy during braking, control the DC-DC converter that transfers the feedback energy generated by the traction motor during braking to the super-capacitor module so as to store it; and otherwise, release the feedback energy generated by the traction motor during braking; wherein the upper limit of the feedback energy represents an allowable maximum capacity of the super-capacitor module.

According to an embodiment of the present application, the energy management system is further configured to, when the traction motor is in the motoring mode, determine whether the energy of the super-capacitor module is larger than a rescue energy required for rescuing the operation of the lift; transfer the feedback energy in the super-capacitor module to the motor drive if the energy of the super-capacitor module is larger than the rescue energy; and otherwise, control the DC-DC converter to stop operation thereof.

According to an embodiment of the present application, the energy management system is further configured to, when the traction motor operates in the motoring mode, determine whether to charge the super-capacitor module according to the energy capacity of the super-capacitor module, control the DC-DC converter connected to the super-capacitor module to charge the super-capacitor module if the energy of the super-capacitor module is less than the rescue energy required for rescuing the operation of the lift, and otherwise, stop the charging to the super-capacitor module.

According to an embodiment of the present application, the energy management system is further configured to, if the power from the power grid is unavailable, send an instruction to the lift controller, so as to force the lift to stop at the nearest floor by the lift controller.

According to an embodiment of the present application, the device for automatically rescuing a lift and saving energy further comprises a super-capacitor management system configured to monitor and manage operation of the super-capacitor module, and send corresponding fault information to the energy management system when finding there is a failure in the super-capacitor module.

According to an embodiment of the present application, the DC-DC converter is a multiple-phase bidirectional power converter composing of a plurality of phase circuits, each of which comprises an inductor and two power switches.

According to an embodiment of the present application, the DC-AC inverter comprises power switches, power diodes, an inductor, a capacitor, a driving circuit, and a control circuit.

According to an embodiment of the present application, the switch circuit comprises contactors or power switches and a driving circuit.

According to another aspect of the present application, there is provided a method for automatically rescuing a lift and saving energy, comprising: when power from a power grid is available, selecting a single-phase power from the power grid as AC supply of a lift controller, and controlling a DC-DC converter to charge a super-capacitor module connected therewith to a specified backup energy; and when the power from the power grid is unavailable, selecting energy stored in the super-capacitor module as a rescue energy for a traction motor and the lift controller.

According to an embodiment of the present application, when the power from the power grid is available, the method further comprising: determining whether to charge the super-capacitor module according to energy capacity of the super-capacitor module; if the energy of the super-capacitor module is less than the rescue energy required for rescuing the operation of the lift, control the DC-DC converter connected to the super-capacitor module to charge the super-capacitor module; and otherwise, stopping the charging to the super-capacitor module.

According to an embodiment of the present application, when the power from the power grid is unavailable, the method further comprises: sending a control signal to the DC-DC converter, a DC-AC inverter, and a switch circuit which are connected together one by one, so that the DC-DC converter transfers the energy stored in the super-capacitor module to the motor drive and the DC-AC inverter, and the switch circuit selects the output from the DC-AC inverter as the AC supply of the lift controller, thus forcing the lift to automatically stop at the nearest floor.

According to an embodiment of the present application, the method further comprises: when the traction motor operates in a braking mode, if the energy of the super-capacitor module is less than an upper limit of the braking feedback energy, controlling the DC-DC converter that transfers the feedback energy of the DC bus generated by the traction motor during braking to the super-capacitor module so as to store it; and otherwise, releasing the feedback energy generated by a traction motor during braking, wherein the upper limit of the feedback energy represents an allowable maximum capacity of the super-capacitor module.

According to an embodiment of the present application, the method further comprises: when the traction motor operates in the motoring mode, determining whether the energy in the super-capacitor module is larger than a rescue energy required for rescuing the operation of the lift; transferring the feedback energy in the super-capacitor module to the motor drive if the energy of the super-capacitor module is larger than rescue energy required for rescuing the operation of the lift; and otherwise, controlling the DC-DC converter to stop operation thereof.

According to a yet aspect of the present application, there is provided a super-capacitor module, which stores backup energy for emergency stopping-at-right-floor-level of the lift and feedback energy generated by a traction motor during braking; wherein the super-capacitor module comprises a plurality of branches connected in parallel, wherein each branch comprises a plurality of units connected in series, each of which comprises a super-capacitor and a balancing circuit connected in parallel with each other, and wherein the balancing circuit is used for maintaining operation of the super-capacitor connected in parallel with the balancing circuit in an allowable operation range.

According to an embodiment of the present application, the super-capacitor is a super-capacitor cell or is composed of a plurality of super-capacitor cells connected in parallel.

The present application provides the stable and reliable power supply for rescuing lifts by using the super-capacitor module when the power failure happens suddenly, stores the feedback energy generated during the lift braking, and reuses the feedback energy during the lift motoring, whereby saving the energy.

These and other aspects of the present application will become apparent from the following description of the preferred embodiment taken in conjunction with the following drawings, although variations and modifications therein may be effected without departing from the spirit and scope of the novel concepts of the present application.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Description of specific embodiments of the present application is made in detail as below. It should be noted that embodiments described herein are only for illustration, and are not restrictive of the present application.

Reference will be made in detail to the present application hereinafter in combination with drawings (showing exemplary embodiments of the present disclosure). However, the present application may be implemented in various different forms, and the present application may not be interpreted as restrictive of embodiments of the present application. More properly speaking, the present application will be deep and complete by providing these embodiments, and the scope of the present application will be comprehensively conveyed to those of ordinary skill in the art. Similar reference numbers throughout drawings represent similar elements.

Terms used herein are only for illustration of specific embodiments and are not inclined to restrictive of the present disclosure. The singular form "one (a, an, the)" used herein intends to also include the plural form unless otherwise clearly specified. It should also be understood that terms "include" and/or "comprise", "contain" and/or "containing", or "have" and/or "is provided with" used herein indicate existence of characteristics, areas, integers, steps, operations, elements and/or components, but are not exclusive of existence or adjunction of one or a plurality of other characteristics, areas, integers, steps, operations, elements, components and/or combination thereof.

Unless otherwise defined, all terms (including technical terms and scientific and technological terms) used herein have the same meanings as usually comprehended by those of ordinary skill in the art. It is also to be understood that in addition to what is specifically defined herein, terms (e.g., terms as defined in a general dictionary) shall be interpreted as meanings consistent with meanings in related technologies and the present disclosure instead of idealized or formalized meanings.

The present application proposes a device for automatically rescuing a lift and saving energy based on a super-capacitor module, which can provide the backup supply for emergency stopping-at-right-floor-level of lifts when power failure happens suddenly and implement the energy-saving operation of lifts. The present application can further implement automatic storage of the backup energy for emergency stopping-at-right-floor-level of lifts and feedback energy from the traction motor during generating/braking in addition to automatic supply to the lift if the power from the power grid is available. Furthermore, the present application can supply energy stored in the super-capacitor continuously to the lift for completing stopping-at-right-floor-level operation if the power failure happens suddenly.

Figure 1:
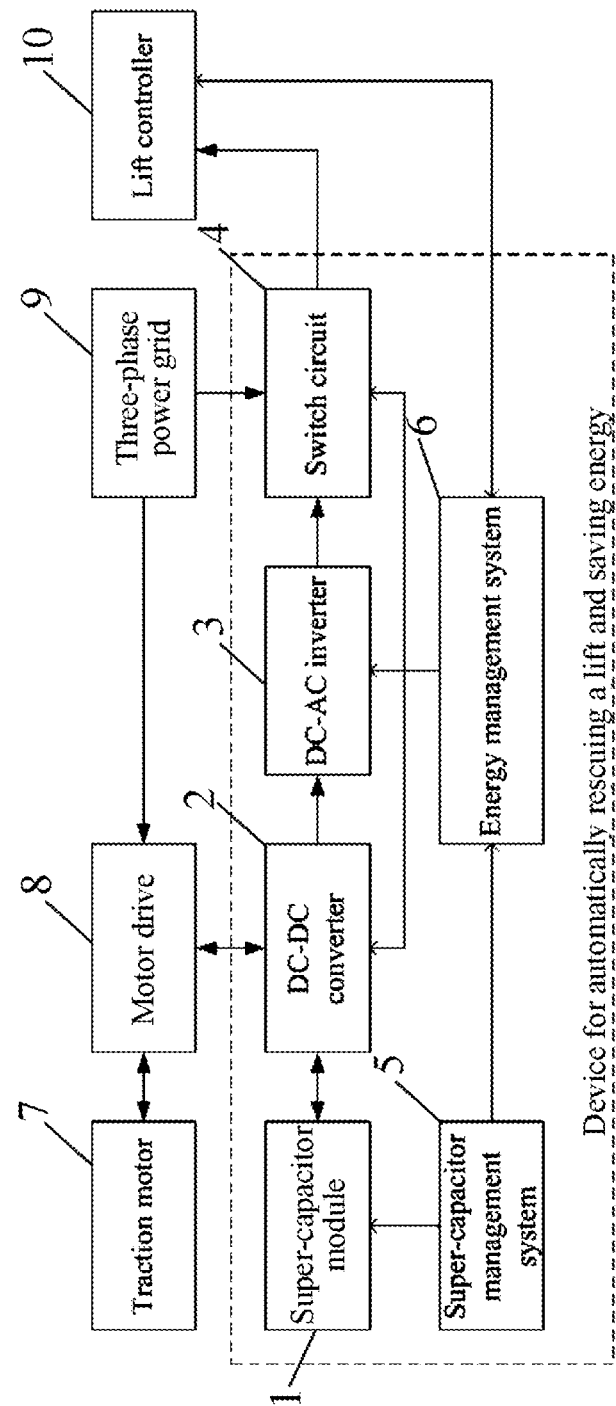
FIG. 1 is a principle block diagram of a device for automatically rescuing a lift and saving energy according to an embodiment of the present application.
Figure 2:
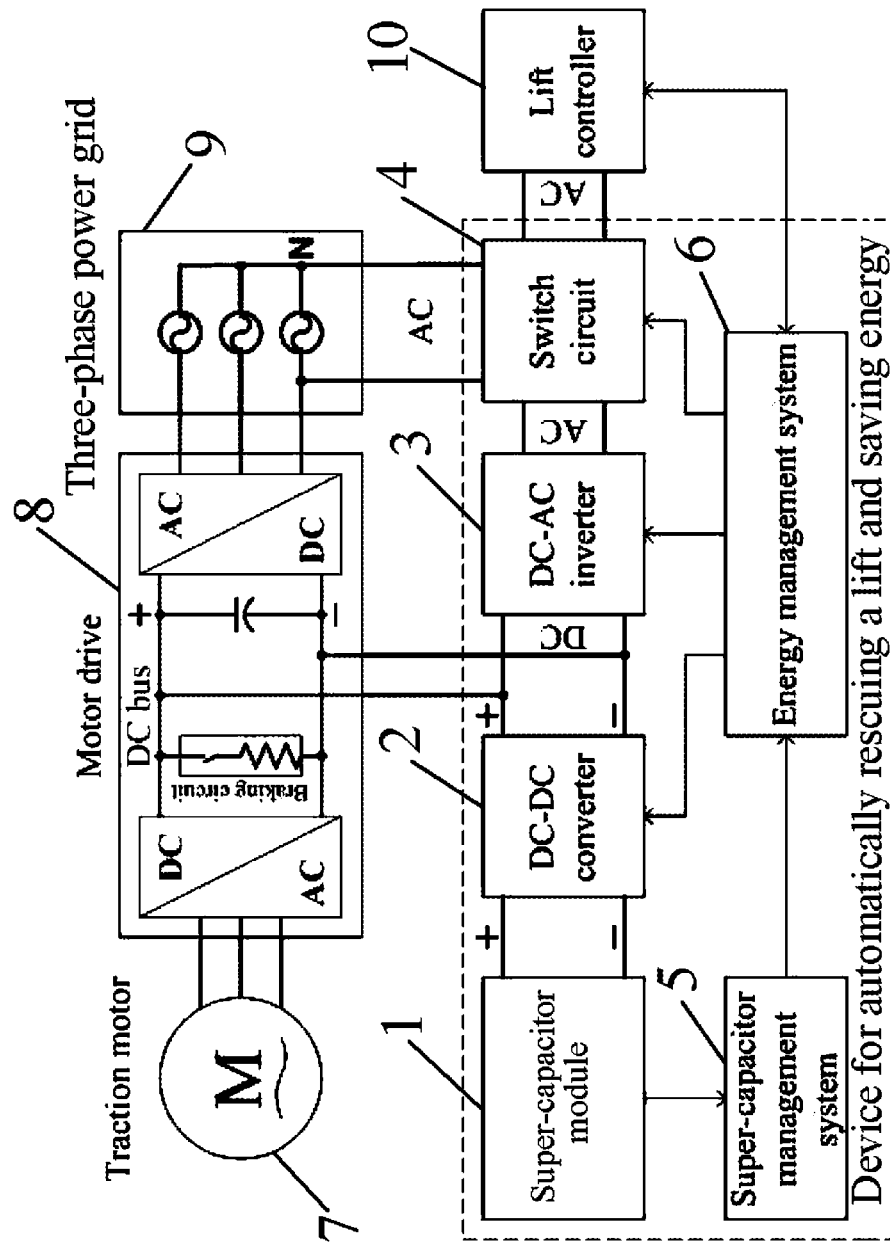
FIG. 2 illustrates a schematic structure of the device for automatically rescuing a lift and saving energy as shown in FIG. 1.

FIG. 1 is a principle block diagram of a device for automatically rescuing a lift and saving energy according to an embodiment of the present application. FIG. 2 illustrates a schematic structure of for automatically rescuing a lift and saving energy as shown in FIG. 1. Referring to FIGS. 1 and 2, the device for automatically rescuing a lift and saving energy of the present application is composed of an energy management system 6, a super-capacitor module 1, a DC-DC converter 2, a DC-AC inverter 3, and a switch circuit 4. The device for automatically rescuing a lift and saving energy is connected with an external three-phase power grid 9 and a motor drive 8. The device for automatically rescuing a lift and saving energy provides energy from the power grid 9 to the motor drive 8 to drive a traction motor 7 to operate normally if the power from the power grid is available, and provides the stored energy to the motor drive 8 to drive the traction motor 7 and the lift controller if the power from the power grid is unavailable, thereby rescuing the operation of the lift.

In an embodiment of the present application, the energy management system 6 is a smart control center of the device of the present application and used to control the operations of automatically rescuing a lift and saving energy.

Specifically, if the power from the power grid is available, the energy management system 6 sends a control signal to the switch circuit 4 that selects the single-phase power in the three-phase power grid as the AC supply of the lift controller 10. At the same time, if the power from the power grid is available, the energy management system 6 further controls the DC-DC converter 2 to charge the super-capacitor module 1 to a specified backup energy for supplying power to the lift controller 10 and the traction motor 7 when the power from the power grid is unavailable.

According to an embodiment of the present application, the lift motion includes a down motion and an up motion. When the lift moves down, the traction motor 7 operates in a braking mode, and in this case, the energy management system 6 controls the DC-DC converter 2 that transfers the feedback energy generated by the traction motor 7 during braking to the super-capacitor module 1. When the lift moves up, the traction motor 7 operates in a motoring mode, and in this case, the energy management system 6 controls the DC-DC converter 2 that supplies the absorbed feedback energy to the traction motor, thereby achieving the energy-saving operation of the lift.

If the power failure happens suddenly, the energy management system 6 controls the DC-AC inverter 3 that converts DC power, which comes from the stored energy in the super-capacitor module 1, into a single-phase AC power, and controls the switch circuit 4 that selects the single-phase AC power output from the DC-AC inverter 3 as the AC supply of the lift controller 10. At the same time, the energy management system 6 further controls the DC-DC converter 2 that passes the backup energy stored in the super-capacitor module 1 to the DC bus connected to the traction motor 8.

In this case, the energy management system 6 further sends a control signal to the lift controller 10 so that the lift is forced to automatically stop at the nearest floor, thus fulfilling the objective of automatic rescue after power failure. Herein, the signal sent by the energy management system 6 to the lift controller 10 may be a voltage signal. For example, if the failure doesn't happen, the voltage signal may be 12V or 24V, etc.; if the failure happens, the voltage signal may be zero Volta, depending on the interface requirement of the lift controller, and so on.

According to an embodiment of the present application, the device for automatically rescuing a lift and saving energy may further include a super-capacitor management system 5 which is used to monitor and manage operation of the super-capacitor module 1 and provides fault information to the energy management system 6. The super-capacitor management system 5 measures and monitors the voltages across super-capacitor cells in the super-capacitor module 1 and the temperature of the different positions inside the super-capacitor module 1. The super-capacitor management system 5 outputs the fault signals to the energy management system 6 if it finds any information on the over-voltage, the over-temperature, and the under-temperature.

The specific circuit configurations and operation principles of respective units in the device for automatically rescuing a lift and saving energy are respectively described with reference to FIGS. 3-6.

Figure 3:
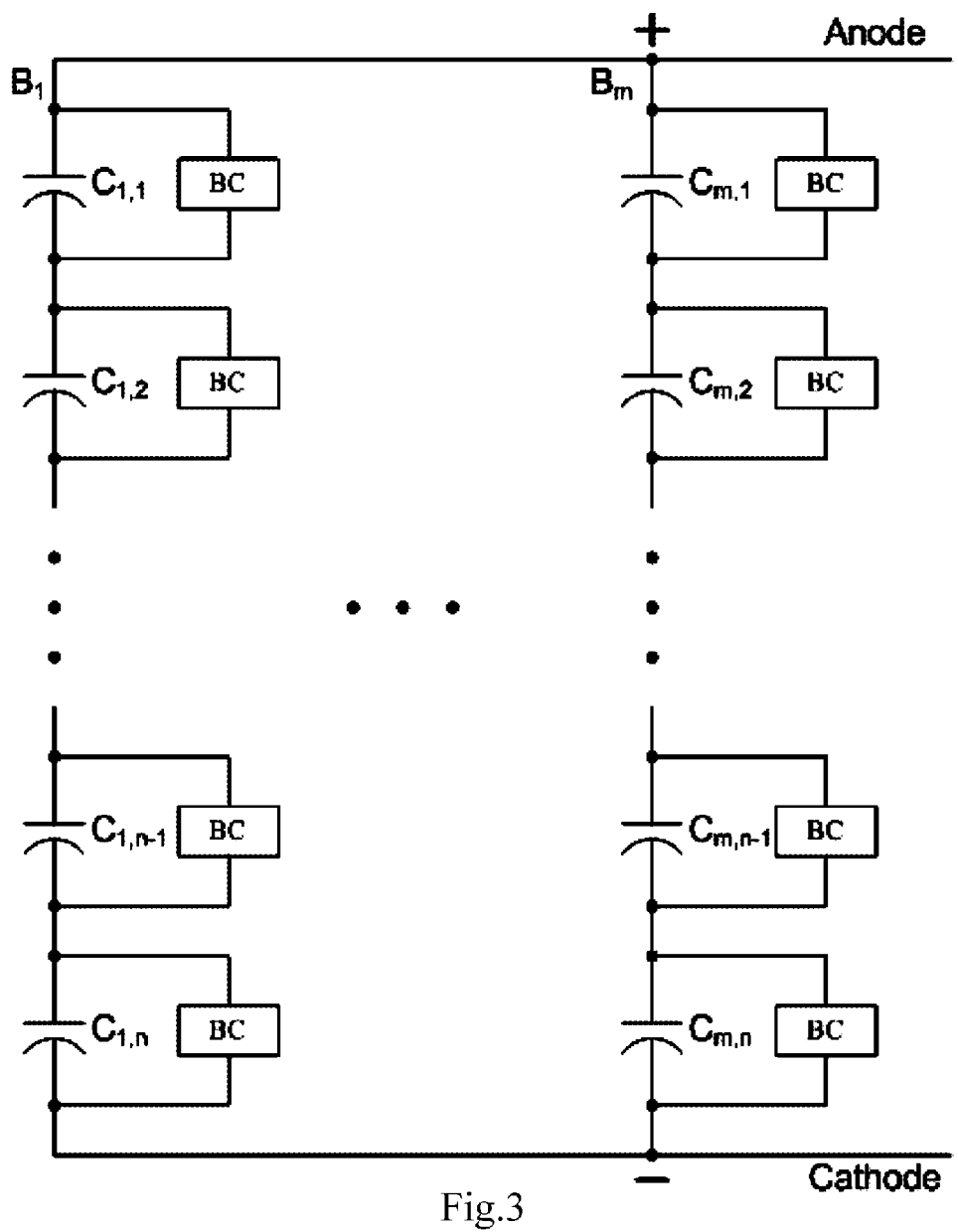
FIG. 3 illustrates a schematic circuit diagram of a super-capacitor module 1 according to an embodiment of the present application.

A circuit diagram of the super-capacitor module according to an embodiment of the present application is illustrated in FIG. 3. The super-capacitor module 1 is connected to the DC-DC converter 2, by which the backup energy for emergency stopping-at-right-floor-level of lifts and the feedback energy generated by the traction motor during braking are stored, and the backup energy is released for emergency stopping-at-right-floor-level of lifts and the feedback energy is released to the traction motor if the power failure happens suddenly. Referring to FIG. 3, the super-capacitor module 1 includes a plurality of super-capacitor cells and a plurality of balancing circuits connected in parallel with the super-capacitor cells. The super-capacitor module 1 consists of m branches connected in parallel where m is an integer. Each branch consists of n units connected in series where n is an integer. Each unit consists of a super capacitor and a balancing circuit (BC), which are connected in parallel with each other. The super-capacitor may be a super-capacitor cell or be composed of a number of super-capacitor cells connected in parallel.

Figure 4:
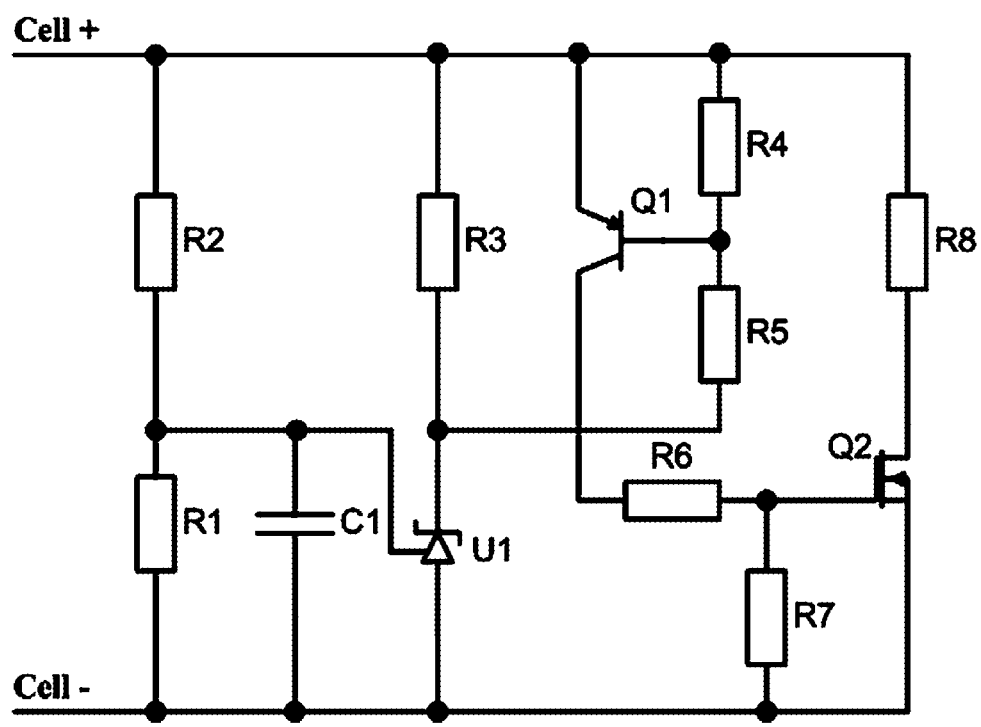
FIG. 4 illustrates a schematic circuit diagram of a balancing circuit (BC) in a super-capacitor module according to an embodiment of the present application.

FIG. 4 illustrates a schematic diagram of the balancing circuit (BC) in the super-capacitor module 1 according to an embodiment of the present application. Referring to FIG. 4, the BC includes resistors (R1, R2, R3, R4, R5, R6, R7, R8), a capacitor (C1), a three-terminal adjustable shunt regulator (U1), a transistor (Q1), and a MOSFET (Q2). Each component may be one or composed of a number of ones connected in series and/or in parallel. The BC as shown in FIG. 4 is only exemplary and the present application is not limited to this.

The balancing circuit (BC) is used to maintain normal operation of a super capacitor connected in parallel with the BC. The transistor (Q1) is conducted and then the MOSFET (Q2) is conducted, if the voltage across the super-capacitor cell is over a specified value. Consequently, the super-capacitor cell discharges to the resistor (R8) in order to reduce the voltage across the super-capacitor cell, thereby fulfilling the objective of protecting the voltage of the super-capacitor in an allowable value. The balancing circuit (BC) is inactive if the voltage across the super-capacitor cell is less than the specified value.

Figure 5:
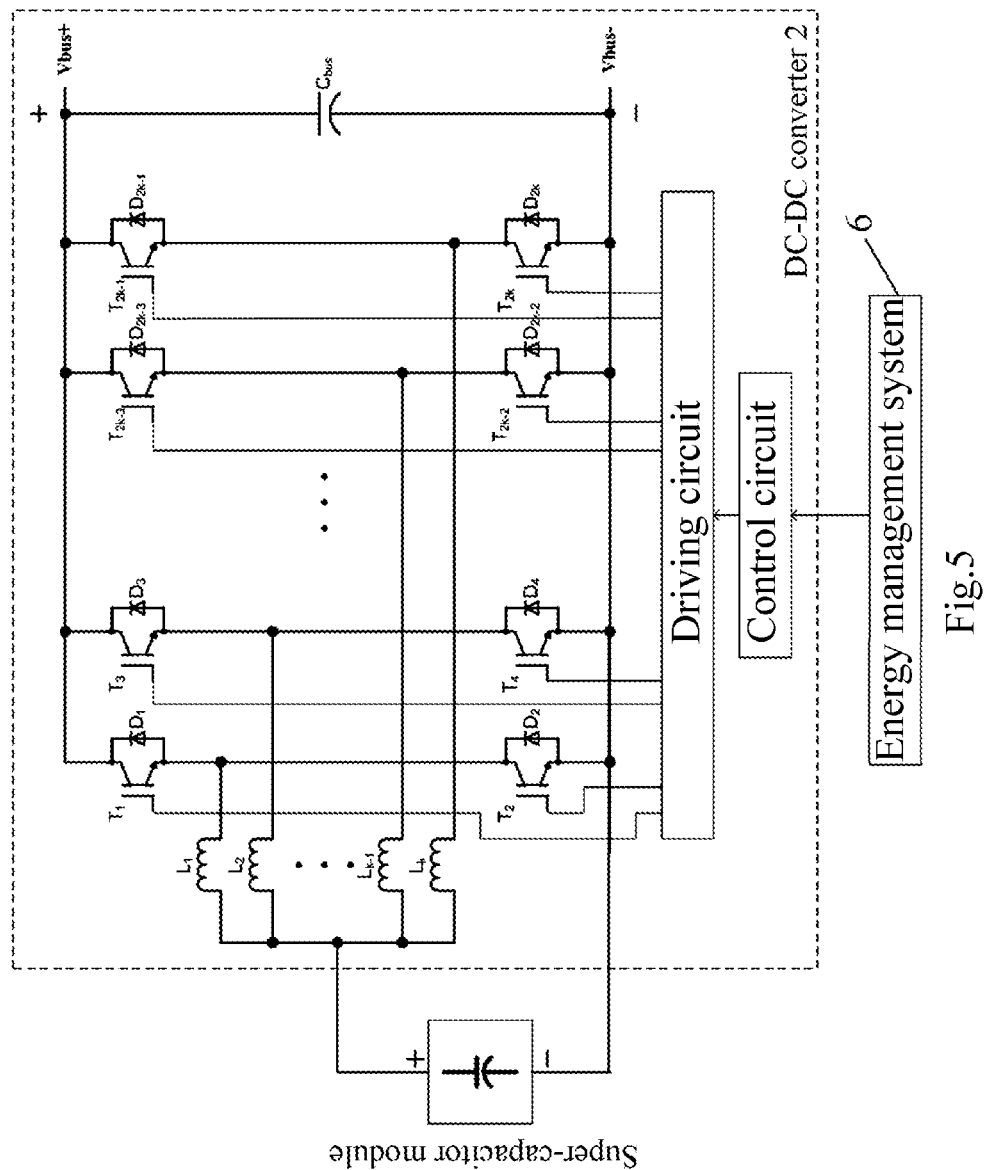
FIG. 5 illustrates a schematic circuit diagram of the DC-DC converter according to an embodiment of the present application

FIG. 5 shows a schematic diagram of the DC-DC converter 2 according to an embodiment of the present application. The DC-DC converter 2 is connected with the super-capacitor module 1, the motor drive 8 and the DC-AC inverter 3 and is controlled by the energy management system 6. The DC-DC converter 2 is composed of inductors (L$_1$~L$_K$), power switches (T$_1$~T$_{2k}$), power diodes (D$_1$~D$_{2k}$), a capacitor, a driving circuit, and a control circuit, where k is an integer, as shown in FIG. 5. Herein, the power switches may be switch components such as IGBTs, or MOSFETs, etc. And the present application is not limited to this. The above DC-DC converter shown in FIG. 5 is only exemplary and the present application is not limited to this.

The DC-DC converter 2 receives the control signal from the energy management system 6 and is used to convert the voltage level of the super-capacitor module 1 into the voltage level of the DC bus in the motor drive 8 and vice versa. And, the DC-DC converter 2 may transfers the energy stored in the super-capacitor module 1 to the traction motor 7 via the DC bus, and may also store the feedback energy generated by the traction motor during braking into the super-capacitor module 1.

Figure 6:
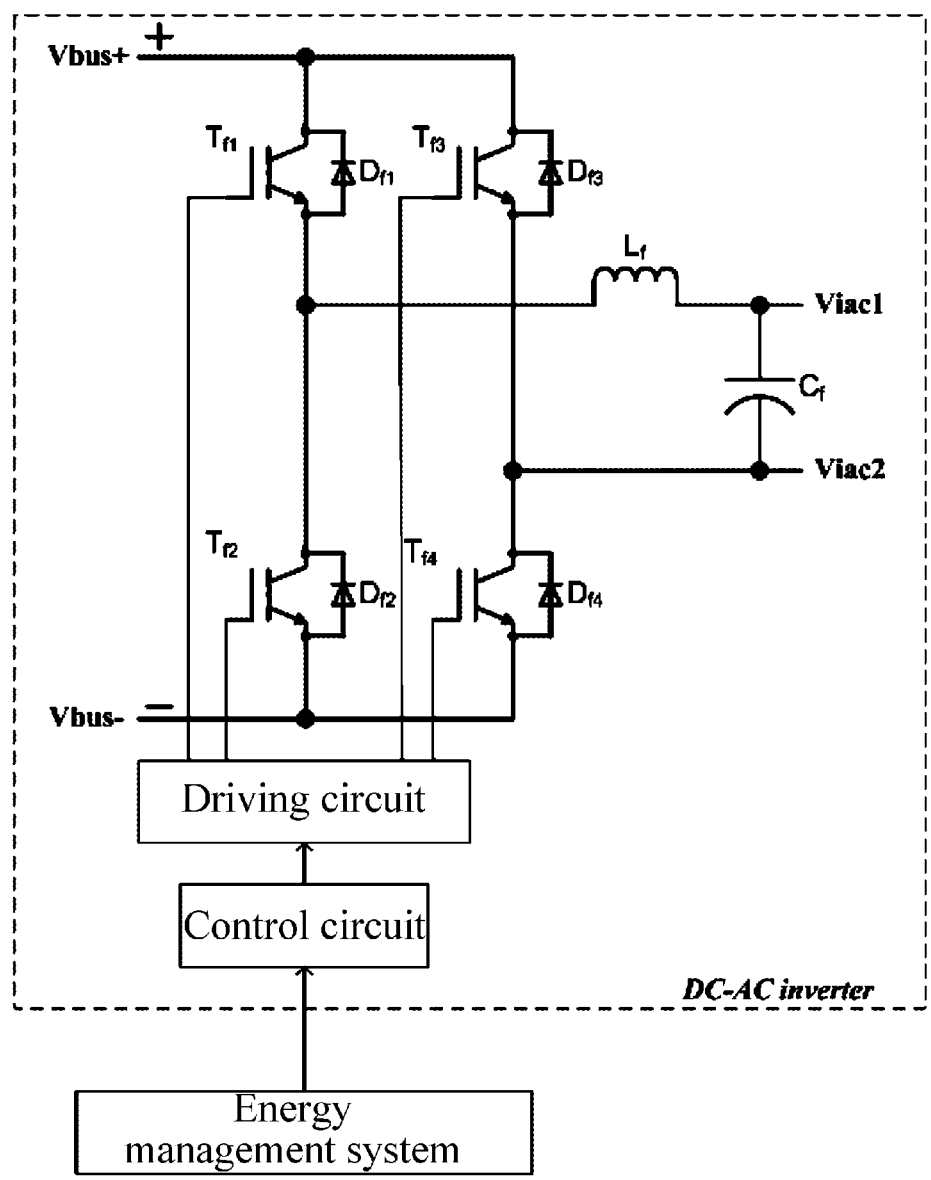
FIG. 6 illustrates a schematic circuit diagram of the DC-AC inverter 3 according to an embodiment of the present application.

A schematic circuit of the DC-AC inverter 3 according to an embodiment of the present application is illustrated in FIG. 6. The DC-AC inverter 3 is connected with the DC-DC converter 2, the motor drive 8, and the switch circuit 4 and controlled by the energy management system 6. Referring to FIG. 6, the DC-AC inverter 3 may be composed of power switches (Tf1, Tf2, Tf3, Tf4, such as IGBTs, MOSFETs, etc.), power diodes (Df1, Df2, Df3, Df4), a filter inductor (Lf), a filter capacitor (Cf), a driving circuit, and a control circuit. The above DC-AC inverter shown in FIG. 6 is only exemplary and the present application is not limited to this.

The DC-AC inverter 3 is controlled by the energy management system 6 and used to invert the DC bus power, which is transferred from the energy stored in the super-capacitor module 1 via the DC-DC converter 2, to the single-phase AC power. Then, the AC power is supplied to the lift controller via the switch circuit 4, thus controlling the lift to stop in emergency when the power failure happens suddenly.

Figure 7:
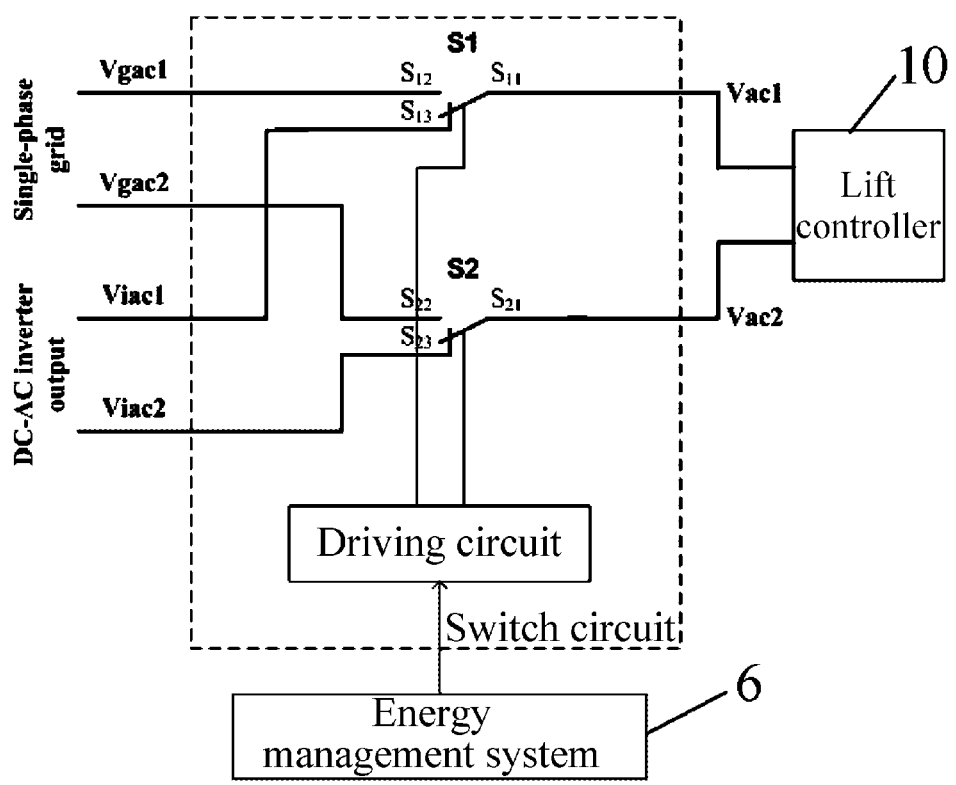
FIG. 7 illustrates a schematic circuit diagram of the switch circuit according to an embodiment of the present application.

A schematic circuit diagram of the switch circuit 4 according to an embodiment of the present application is illustrated in FIG. 7. The switch circuit 4 is connected with the power grid 9 and the lift controller 10, and includes contactors or power switches (S1, S2) and a driving circuit. The switch circuit 4 is controlled by the energy management system 6 and used to select one of two input AC sources depending on the control of the energy management system, in order to supply the lift controller. If the power from the power grid is available, the single-phase power from the three-phase grid is connected to the lift controller 10 as the single-phase AC power supply of the lift controller 10, and if the power failure happens suddenly, the output from the DC-AC inverter is selected to be connected to the lift controller 10 as the single-phase AC supply of the lift controller 10.

The method of automatically rescuing a lift and saving energy will be described with reference to FIG. 8.

Figure 8:
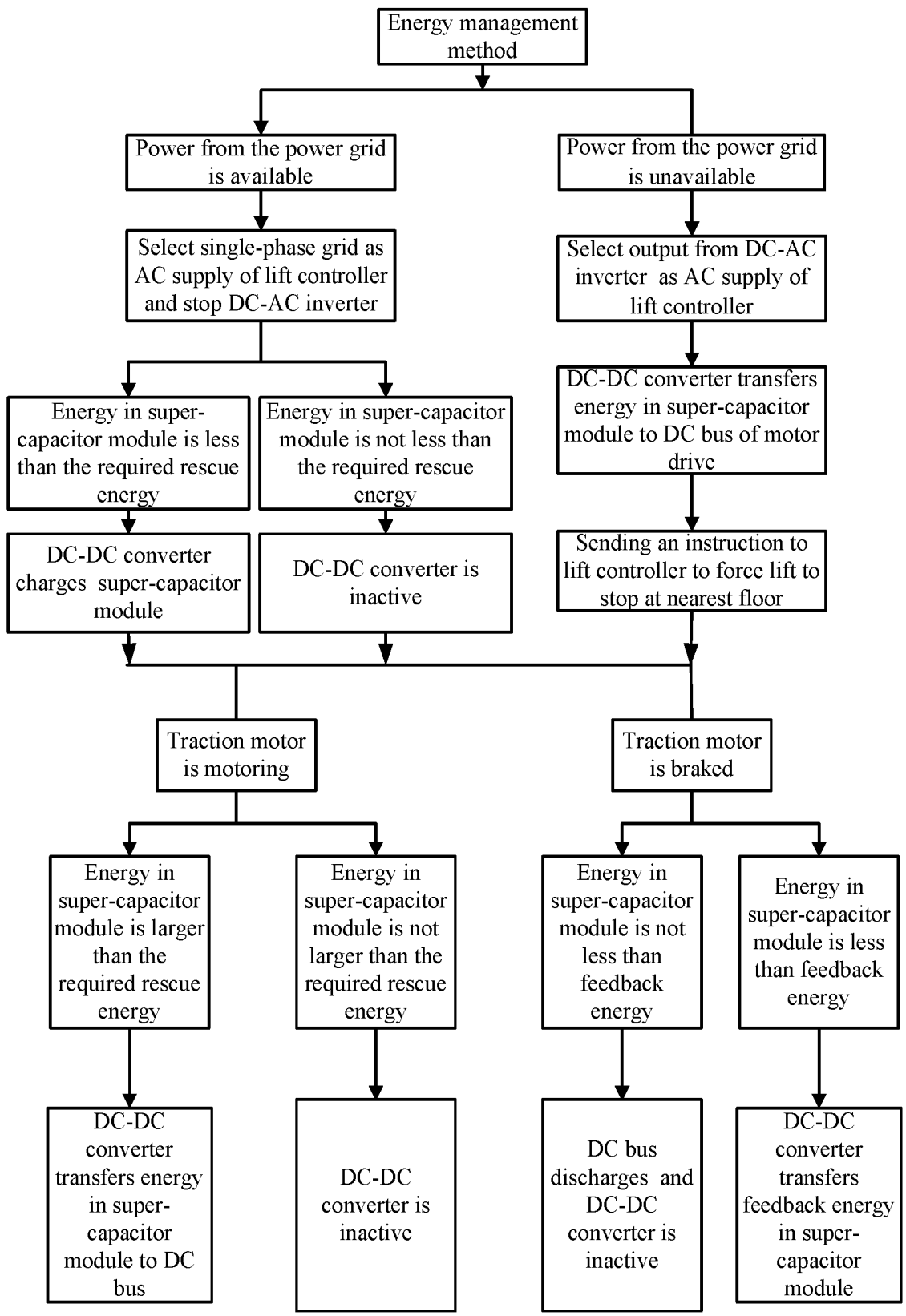
FIG. 8 illustrates a flowchart of a method for automatically rescuing a lift and saving energy.

As shown in FIG. 8, the method of automatically rescuing a lift and saving energy includes two situations, one of which is to store energy for rescuing the operation of the lift if the grid power is available, and the other of which is to use the stored energy as the backup power supply of a traction motor and as the power supply of a lift controller, if the grid power is unavailable, thus enabling the lift controller to control the operation of the lift and the emergency stopping of the lift at nearest floor.

In the case that the power from the power grid is available, the energy management system 6 controls the DC-DC converter 2 to charge the super-capacitor module 1 to a specified backup energy. When the traction motor 7 is braked, the energy management system 6 sends a control signal to the DC-DC converter 2 that transfers the feedback energy generated by the traction motor 7 during braking to the super-capacitor module 1. When the traction motor 7 operates in the motoring mode, the energy management system 6 sends a control signal to the DC-DC converter 2 that transfers the energy stored in the super-capacitor module to the DC bus for the traction motor. If the power from the power grid is unavailable, the energy management system 6 immediately sends control signals to the DC-DC converter 2 and the switch circuit 4 so that the DC-DC converter 2 transfers the energy stored in the super-capacitor module 1 to the DC bus and the switch circuit 4 selects the AC output of the DC-AC inverter 3 as the AC supply of the lift controller, and at the same time, the energy management system 6 further sends a control signal to the lift controller 10 in order that the lift is forced to automatically stop at the nearest floor. If the energy management system 6 receives any fault signals from the super-capacitor management system 5 and the lift controller 10, the energy management system 6 may send control signals to the DC-DC converter 2 so that the DC-DC converter 2 is turned off. Alternatively, the energy management system 6 may send alarm information.

Specially, when the power from the power grid is available, the single-phase power from the three-phase grid is selected as the AC power of the lift controller 10, and the energy management system 6 controls the DC-AC inverter 3 so as to stop the operation of the DC-AC inverter 3. In this case, it is determined whether to charge the super-capacitor module 1 when the power from the power grid is available, according to the capacity of the energy of the super-capacitor module 1, in order to store the backup energy, for example, the energy management system 6 detects the voltage of the super-capacitor module 1 via the DC-DC converter so as to estimate the energy of the super-capacitor module 1.

If the energy of the super-capacitor module 1 is less than the rescue energy required for rescuing the operation of the lift, the DC-DC converter is controlled to charge the super-capacitor module 1. Consequently, the DC power of the DC bus of the motor drive supplied by the three-phase grid is supplied to the super-capacitor module 1 via the DC-DC converter 2, so as to charge the super-capacitor module 1 to a specified backup energy. If the energy of the super-capacitor module 1 is not less than the rescue energy required for rescuing the operation of the lift, it shows that the energy stored in the super-capacitor module 1 is large enough to ensure the rescue energy to rescue the operation of the lift. Herein, the rescue energy is a value for rescuing the operation of the lift which is determined according to the elevator capacity and power.

According to an embodiment of the present application, it is determined how to store and supply the feedback energy according to the lift up-motion or lift down-motion, that is, according to motoring motion or braking motion of the traction motor.

When the lift moves down, that is, the traction motor operates in a braking mode, if the energy of the super-capacitor module 1 is less than an upper limit of the braking feedback energy, it shows that the super-capacitor module 1 may store energy and then the DC-DC converter is controlled to transfer the feedback energy of the DC bus generated by the traction motor during braking to the super-capacitor module 1 so as to store it. Herein, the upper limit of the braking feedback energy represents the allowable maximum capacity of the super-capacitor module 1. If the energy of the super-capacitor module 1 is over the upper limit of the braking feedback energy, the feedback energy generated by the traction motor during braking is released via the DC bus. According to an embodiment of the present application, the DC bus may release the feedback energy via a braking circuit (for example, as shown in FIG. 2, a braking resistor is connected in series with a switch and then is connected with the DC bus, which are collectively referred as the braking circuit), so that the voltage across the DC bus is not over the upper limit thereof.

When the traction motor is in the motoring mode, on the premise of ensuring the energy of the super-capacitor module 1 is not less than the rescue energy, the super-capacitor module 1 transfers the redundant feedback energy to the DC bus, so as to supply the energy to the motor drive, thereby saving energy. Consequently, before supplying the feedback energy to the motor drive, it is firstly determined whether the energy of the super-capacitor module 1 is larger than the required rescue energy. If the energy of the super-capacitor module 1 is larger than the required rescue energy, it is determined to transfer the feedback energy in the super-capacitor module 1 to the DC bus of the motor drive via the DC-DC converter. If the energy of the super-capacitor module 1 is less than the required rescue energy, that is, the total of the backup energy and the feedback energy in the super-capacitor module 1 is less than the required rescue energy, the DC-DC converter is controlled to stop and thus the feedback energy is not transferred.

When the power failure happens suddenly, the energy management system 6 selects the energy stored in the super-capacitor module 1 as the rescue energy of the traction motor and the lift controller. At the same time, the energy management system 6 sends a control signal to the DC-DC converter 2 that transfers the energy stored in the super-capacitor module 1 to the DC bus, and the DC-AC inverter 3 begins to operate. Then, the energy management system 6 sends an instruction to the switch circuit 4 that selects the output from the DC-AC inverter 3 as the AC supply of the lift controller 10, and at the same time, sends a control signal to the lift controller 10, thereby forcing the lift to stop emergently at the nearest floor.

According to the above embodiments, the present application provides the stable and reliable power supply for rescuing lifts by using the super-capacitor module when the power failure happens suddenly, stores the feedback energy generated during the lift braking, and reuses the feedback energy during the lift motoring, whereby saving the energy.

Selection and description of these embodiments are for the purpose of explaining the principle and practical application of the present disclosure, thus motivating those of ordinary skill in the art to make use of the present disclosure and its embodiments as well as modifications thereof suitable for special expected use. Obviously, those of ordinary skill in the art can substitute embodiments without departing from the spirit and scope of the present disclosure. Therefore, the scope of present disclosure is limited by the appended claims instead of the foregoing specification and exemplary embodiments as described thereinto.

What is claimed is:

1. A device for automatically rescuing a lift and saving energy, comprising:
a super-capacitor module configured to store energy comprising backup energy for emergency stopping-at-right-floor-level of the lift and feedback energy generated by a traction motor during braking;
a DC-DC converter connected to the super-capacitor module and a motor drive for driving the traction motor of the lift, and configured to convert a voltage level of the super-capacitor module into a voltage level of a DC bus of the motor drive, and further configured to convert the voltage level of the DC bus into the voltage level of the super-capacitor module;
a DC-AC inverter connected to the DC-DC converter, and configured to convert DC power output from the DC-DC converter into AC power;
a switch circuit connected to the DC-AC inverter and a power grid, and configured to select and switch between the DC-AC inverter and the power grid so as to output the converted AC power by the AC-DC inverter to a lift controller or output AC power from the power grid to the lift controller; and
an energy management system connected to the DC-DC converter, the DC-AC inverter, and the switch circuit and configured to, if power from the power grid is available, control the switch circuit that selects the power grid to be connected the lift controller as AC supply of the lift controller, and control the DC-DC converter that charges the super-capacitor module to a specified backup energy; and also configured to, if the power from the power grid is unavailable, control the DC-DC converter that converts the energy in the super-capacitor module into DC power to be output to the DC-AC inverter, control the DC-AC inverter that converts the DC power into AC power, and control the switch circuit that select the AC power as the AC supply of the lift controller while controlling the DC-DC converter that supplies the energy in the super-capacitor module to the motor drive,
wherein the energy management system is further configured to control the DC-DC converter that enables the super-capacitor module to store the feedback energy generated by the traction motor during braking when the traction motor operates in a braking mode, and control the DC-DC converter that supplies the stored feedback energy to the traction motor when the traction motor is in a motoring mode.

2. The device for automatically rescuing a lift and saving energy according to claim 1, wherein the super-capacitor module comprises a plurality of branches connected in parallel, wherein each branch comprises a plurality of super capacitor units connected in series, each of which comprises a super capacitor and a balancing circuit connected in parallel with each other, and wherein the balancing circuit is used for maintaining operation of the super-capacitor connected in parallel with the balancing circuit in an allowable operation range.

3. The device for automatically rescuing a lift and saving energy according to claim 1, wherein the energy management system is further configured to: when the traction motor operates in the braking mode, if the energy of the super-capacitor module is less than an upper limit of the feedback energy during braking, control the DC-DC converter that transfers the feedback energy generated by the traction motor during braking to the super-capacitor module so as to store it; and otherwise, release the feedback energy generated by the traction motor during braking; wherein the upper limit of the feedback energy represents an allowable maximum capacity of the super-capacitor module.

4. The device for automatically rescuing a lift and saving energy according to claim 1, wherein the energy management system is further configured to, when the traction motor is in the motoring mode, determine whether the energy of the super-capacitor module is larger than a rescue energy required for rescuing the operation of the lift; transfer the feedback energy in the super-capacitor module to the motor drive if the energy of the super-capacitor module is larger than the rescue energy; and otherwise, control the DC-DC converter to stop operation thereof.

5. The device for automatically rescuing a lift and saving energy according to claim 1, wherein the energy management system is further configured to, when the traction motor operates in the motoring mode, determine whether to charge the super-capacitor module according to the energy capacity of the super-capacitor module, control the DC-DC converter connected to the super-capacitor module to charge the super-capacitor module if the energy of the super-capacitor module is less than the rescue energy required for rescuing the operation of the lift, and otherwise, stop the charging to the super-capacitor module.

6. The device for automatically rescuing a lift and saving energy according to claim 1, wherein the energy management system is further configured to, if the power from the power grid is unavailable, send an instruction to the lift controller, so as to force the lift to stop at the nearest floor by the lift controller.

7. The device for automatically rescuing a lift and saving energy according to claim 1, further comprising a super-capacitor management system configured to monitor and manage operation of the super-capacitor module, and send corresponding fault information to the energy management system when finding there is a failure in the super-capacitor module.

8. The device for automatically rescuing a lift and saving energy according to claim 1, wherein the DC-DC converter is a multiple-phase bidirectional power converter comprising a plurality of phase circuits, each of which comprises an inductor and two power switches.

9. The device for automatically rescuing a lift and saving energy according to claim 1, wherein the DC-AC inverter comprises power switches, power diodes, an inductor, a capacitor, a driving circuit, and a control circuit.

10. The device for automatically rescuing a lift and saving energy according to claim 1, wherein the switch circuit comprises contactors or power switches and a driving circuit.

11. A method for automatically rescuing a lift and saving energy, comprising:
when power from a power grid is available, (a) selecting a single-phase power from the power grid as AC supply of a lift controller, and controlling a DC-DC converter to charge a super-capacitor module connected therewith to a specified backup energy; and (b) determining whether to charge the super-capacitor module according to energy capacity of the super-capacitor module; if the energy of the super-capacitor module is less than the rescue energy required for rescuing the operation of the lift controller, control the DC-DC converter connected to the super-capacitor module to charge the super-capacitor module; and otherwise, stopping the charging to the super-capacitor module; and when the power from the power grid is unavailable, selecting energy stored in the super-capacitor module as a rescue energy for a traction motor and the lift controller.

12. The method for automatically rescuing a lift and saving energy according to claim 11, wherein when the power from the power grid is unavailable, the method further comprises: sending a control signal to the DC-DC converter, a DC-AC inverter, and a switch circuit which are connected together one by one, so that the DC-DC converter transfers the energy stored in the super-capacitor module to the motor drive and the DC-AC inverter, and the switch circuit selects the output from the DC-AC inverter as the AC supply of the lift controller, thus forcing the lift to automatically stop at the nearest floor.

13. The method for automatically rescuing a lift and saving energy according to claim 11, further comprising: when the traction motor operates in a braking mode, if the energy of the super-capacitor module is less than an upper limit of the braking feedback energy, controlling the DC-DC converter that transfers the feedback energy of the DC bus generated by the traction motor during braking to the super-capacitor module so as to store it; and otherwise, releasing the feedback energy generated by a traction motor during braking, wherein the upper limit of the feedback energy represents an allowable maximum capacity of the super-capacitor module.

14. The method for automatically rescuing a lift and saving energy according to claim 11, further comprising: when the traction motor operates in the motoring mode, determining whether the energy in the super-capacitor module is larger than a rescue energy required for rescuing the operation of the lift; transferring the feedback energy in the super-capacitor module to the motor drive if the energy of the super-capacitor module is larger than rescue energy required for rescuing the operation of the lift; and otherwise, controlling the DC-DC converter to stop operation thereof.

15. A super-capacitor module, which stores backup energy for emergency stopping-at-right-floor-level of the lift and feedback energy generated by a traction motor during braking, and supplies the stored feedback energy to the traction motor when the traction motor is in a motoring mode; wherein the super-capacitor module comprises a plurality of branches connected in parallel, wherein each branch comprises a plurality of units connected in series, each of which comprises a super-capacitor and a balancing circuit connected in parallel with each other, and wherein the balancing circuit is used for maintaining operation of the super-capacitor connected in parallel with the balancing circuit in an allowable operation range.

16. The super-capacitor module according to claim 15, wherein the super-capacitor is a super-capacitor cell or is composed of a plurality of super-capacitor cells connected in parallel.

17. The device for automatically rescuing a lift and saving energy according to claim 2, wherein the energy management system is further configured to, when the traction motor operates in the motoring mode, determine whether to charge the super-capacitor module according to the energy capacity of the super-capacitor module, control the DC-DC converter connected to the super-capacitor module to charge the super-capacitor module if the energy of the super-capacitor module is less than the rescue energy required for rescuing the operation of the lift, and otherwise, stop the charging to the super-capacitor module.

18. The device for automatically rescuing a lift and saving energy according to claim 1, wherein the energy management system is further configured to, when the traction motor operates in the motoring mode, determine whether to charge the super-capacitor module according to the energy capacity of the super-capacitor module, control the DC-DC converter connected to the super-capacitor module to charge the super-capacitor module if the energy of the super-capacitor module is less than the rescue energy required for rescuing the operation of the lift, and otherwise, stop the charging to the super-capacitor module.

* * * * *